(12) United States Patent
Campomanes et al.

(10) Patent No.: US 10,011,044 B2
(45) Date of Patent: Jul. 3, 2018

(54) METHOD OF FORMING GREEN PART AND MANUFACTURING METHOD USING SAME

(71) Applicant: Pratt & Whitney Canada Corp., Longueuil (CA)

(72) Inventors: Marc Campomanes, Longueuil (CA); Orlando Scalzo, Montreal (CA); Jean Fournier, Longueuil (CA); Guillaume Poitras, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 701 days.

(21) Appl. No.: 14/479,738

(22) Filed: Sep. 8, 2014

(65) Prior Publication Data

US 2016/0016329 A1  Jan. 21, 2016

Related U.S. Application Data

(60) Provisional application No. 62/026,989, filed on Jul. 21, 2014.

(51) Int. Cl.
*B28B 1/24* (2006.01)
*B28B 11/08* (2006.01)
*B28B 11/12* (2006.01)
*B22F 3/22* (2006.01)
*B22F 7/08* (2006.01)
(Continued)

(52) U.S. Cl.
CPC .............. *B28B 11/12* (2013.01); *B22F 3/225* (2013.01); *B22F 7/08* (2013.01); *C04B 35/56* (2013.01); *C04B 35/6455* (2013.01); *B22F 2998/10* (2013.01); *C04B 2235/6022* (2013.01)

(58) Field of Classification Search
CPC .... C04B 2235/6022; B22F 3/225; B22F 7/08; B28B 1/24
USPC .................................................. 264/DIG. 44
See application file for complete search history.

(56) References Cited

U.S. PATENT DOCUMENTS

| 5,672,363 | A | * | 9/1997 | Sagawa | .................. B22F 3/003 264/313 |
| 6,027,686 | A | | 2/2000 | Takahashi et al. | |
| 6,056,915 | A | | 5/2000 | Behi et al. | |

(Continued)

FOREIGN PATENT DOCUMENTS

| EP | 1077099 | 10/2004 |
| EP | 2543458 | 1/2013 |

*Primary Examiner* — Eric Snelting
(74) *Attorney, Agent, or Firm* — Norton Rose Fulbright Canada LLP

(57) ABSTRACT

A method of manufacturing a part, including providing a green body made of powder injection molding material and connected to a solid support member partially contained in the green body. The support member is engaged with a retaining fixture of a machine tool. While supporting the green body through the engagement between the support member and the retaining fixture, the green body is machined to obtain a machined green part. The machined green part is debound and sintered. A method of forming a powder injection molding part in a green state including machining a molded body using a machine tool while supporting the blank with a retaining fixture, and a machining blank having a green body and a solid support member including one locating feature of a pair of complementary locating features snuggly engageable with one another are also discussed.

9 Claims, 6 Drawing Sheets

(51) Int. Cl.
*C04B 35/56* (2006.01)
*C04B 35/645* (2006.01)

(56) References Cited

U.S. PATENT DOCUMENTS

| | | |
|---|---|---|
| 6,444,167 B1 | 9/2002 | Shimodaira et al. |
| 6,547,210 B1 * | 4/2003 | Marx ................ B22F 3/225 |
| | | 249/175 |
| 8,568,117 B2 | 10/2013 | Scancarello |
| 8,871,132 B2 | 10/2014 | Abels et al. |
| 2007/0000128 A1 | 1/2007 | Chung et al. |
| 2007/0003426 A1 * | 1/2007 | Lu ................ B22F 3/1017 |
| | | 419/30 |
| 2010/0944420 | 4/2010 | Grohowski, Jr. |
| 2014/0170433 A1 | 6/2014 | Schick et al. |
| 2015/0066190 A1 | 3/2015 | Brown et al. |
| 2015/0093274 A1 | 4/2015 | Stover et al. |

\* cited by examiner

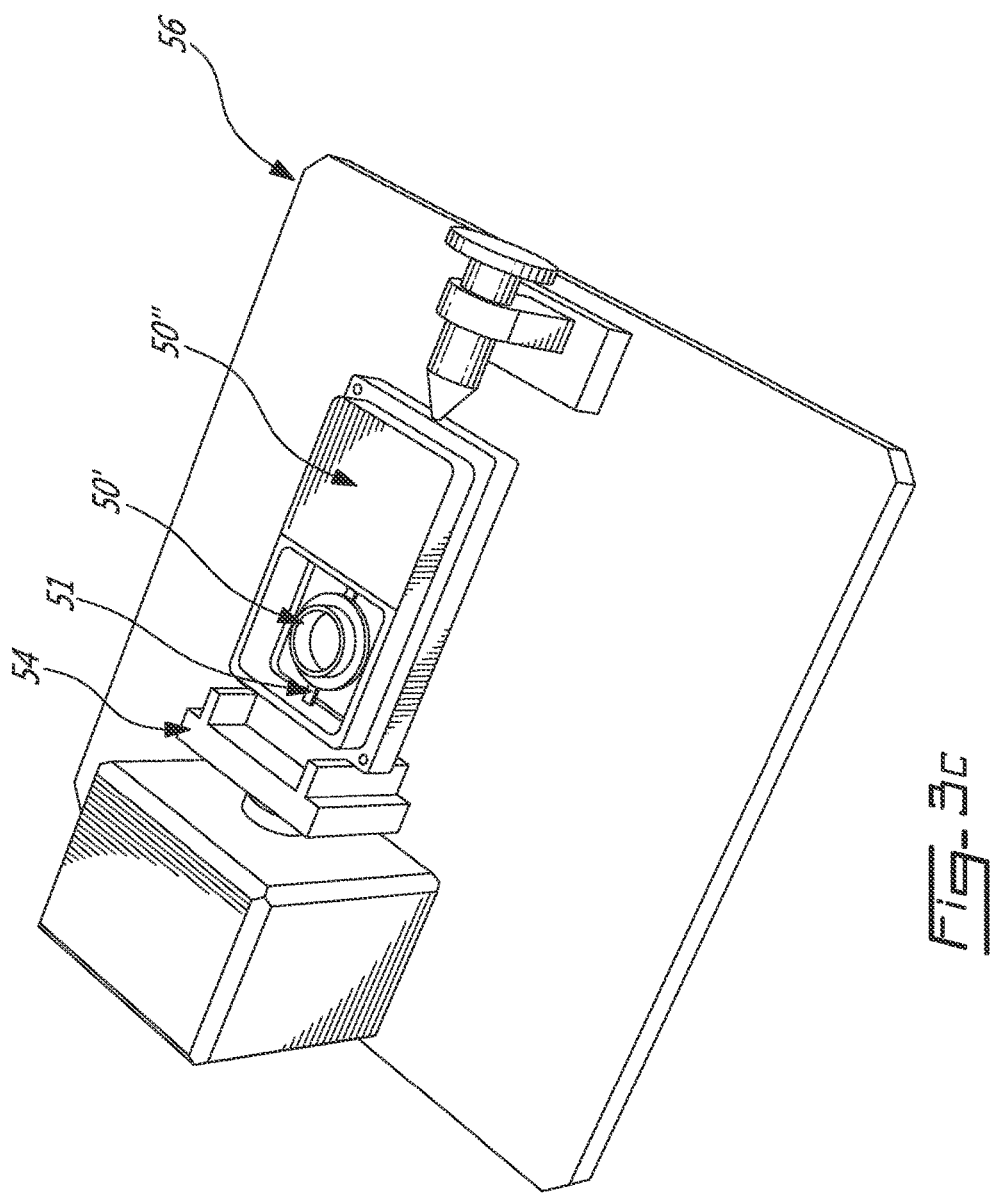

METHOD OF FORMING GREEN PART AND MANUFACTURING METHOD USING SAME

CROSS-REFERENCE TO RELATED APPLICATIONS

This application claims priority from provisional application No. 62/026,989 filed Jul. 21, 2014, the entire contents of which are incorporated by reference herein.

TECHNICAL FIELD

The application relates generally to powder injection molding and, more particularly, to green part(s) obtained by powder injection molding.

BACKGROUND OF THE ART

Powder injection molding such as metal injection molding may offer a cost-savings advantage on small, complex parts that are difficult to machine. However, the process to design the mold for a given workpiece is often iterative, for example because of difficulties in predicting the amount of shrinkage during the debinding and sintering steps; as such, it may be required to successively manufacture and test several molds before the dimensions for the final mold can be determined. Accordingly, design, manufacture, and test of a mold can lead to significant lead-time initial cost.

SUMMARY

In one aspect, there is provided a method of manufacturing a part, the method comprising: providing a green body made of powder injection molding material, the powder injection molding material including a solidified binder and a powder material mixed with the binder, the green body being connected to a solid support member partially contained in the green body; engaging the support member with a retaining fixture of a machine tool; while supporting the green body through the engagement between the support member and the retaining fixture, machining the green body using the machine tool to obtain a machined green part; and debinding and sintering the machined green part.

In another aspect, there is provided a machining blank comprising: a green body made of powder injection molding material, the powder injection molding material including a solidified binder and a powder material mixed with the binder; and a solid support member having a greater rigidity than the green body, the support member having an inner portion embedded within the green body and an outer portion extending out of the green body, the outer portion including one feature of a pair of complementary locating features snuggly engageable with one another, the outer portion being adapted to be engaged with a retaining fixture including the other feature of the pair of complementary locating features.

In a further aspect, there is provided a method of forming a powder injection molding part in a green state, the method comprising: providing a blank having a molded body, the molded body being in the green state and made of powder injection molding material, the powder injection molding material including a solidified binder and a powder material mixed with the binder material; engaging the blank with a retaining fixture of a machine tool; and while supporting the blank with the retaining fixture, machining the molded body using the machine tool to obtain a machined green part in the green state.

DESCRIPTION OF THE DRAWINGS

Reference is now made to the accompanying figures in which:

FIG. 3c is a schematic tridimensional view of the green body and support member of FIG. 3a during machining;

DETAILED DESCRIPTION

Figure 1:
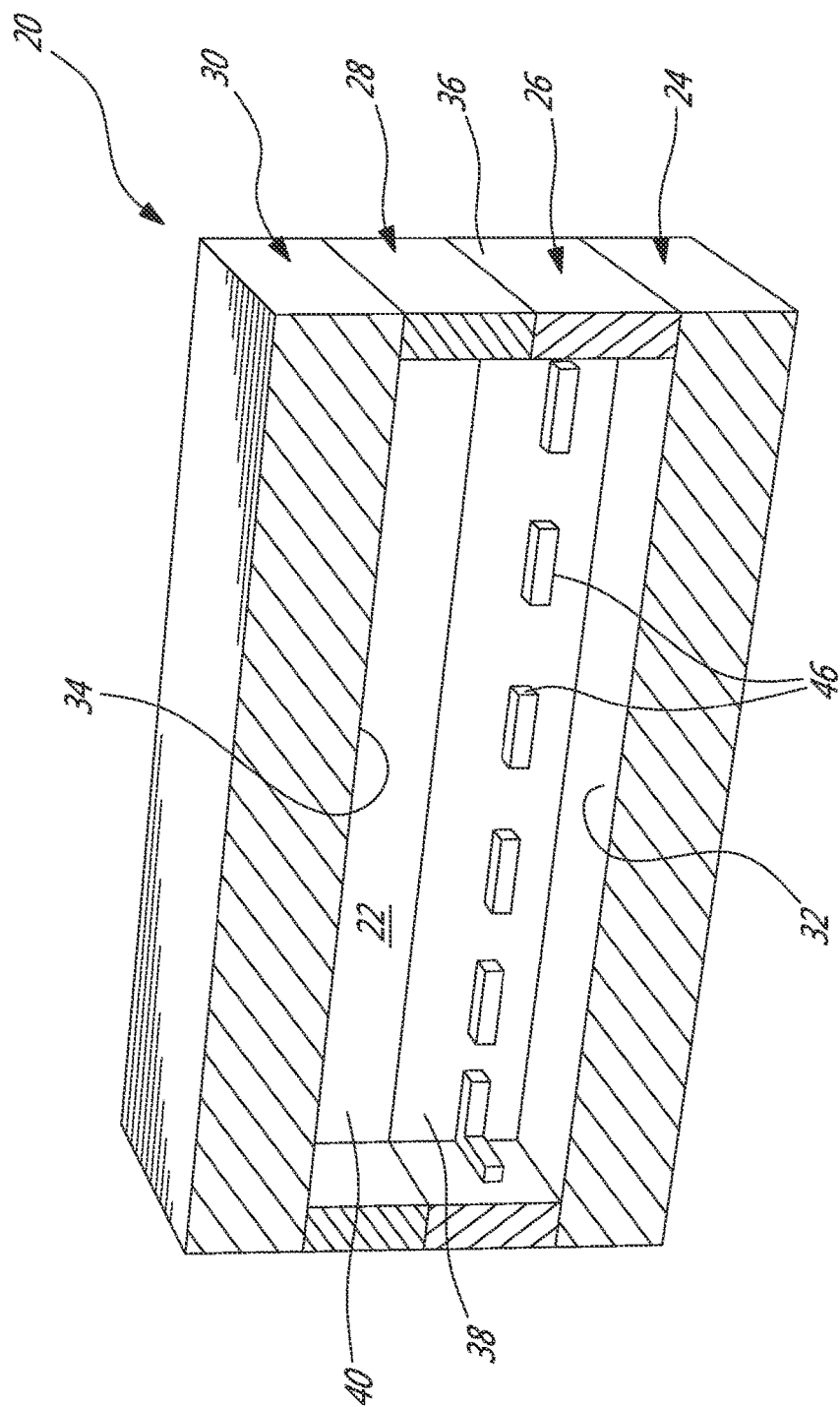
FIG. 1 is a schematic, cross-sectional tridimensional view of a mold including a support member in accordance with a particular embodiment.

The present application discusses a method of manufacturing a part using powder injection molding, in which the green part is machined after being molded and before the debinding and sintering steps are performed.

As is typical in powder injection molding, a suitable feedstock is injected into a mold cavity to obtain the green part. Such a feedstock can include high temperature resistant powder metal alloys (metal injection molding), such as a nickel superalloy, or ceramic, glass, carbide powders or mixtures thereof, mixed with an appropriate binder. Other high temperature resistant material powders which may include one material or a mix of materials could be used as well. The feedstock is a mixture of the material powder and of a binder which may include one or more binding material(s). In a particular embodiment, the binder includes an organic material which is molten above room temperature (20° C.) but solid or substantially solid at room temperature. The binder may include various components such as surfactants which are known to assist the injection of the feedstock into mold for production of the green part. In a particular embodiment, the binder includes a mixture of binding materials, for example including a lower melting temperature polymer, such as a polymer having a melting temperature below 100° C. (e.g. paraffin wax, polyethylene glycol, microcrystalline wax) and a higher melting temperature polymer or polymers, such as a polymer or polymers having a melting temperature above 100° C. (e.g. polypropylene, polyethylene, polystyrene, polyvinyl chloride). Different combinations are also possible. In a particular embodiment, the material powder is mixed with the molten binder and the suspension of injection powder and binder is injected into the mold cavity and cooled to a temperature below that of the melting point of the binder. "Green state" or "green" as discussed herein refers to a molded part produced by the solidified binder that holds the injection powder together.

Since the feedstock is wax and/or polymer based, machining the green part can be performed with cutting feeds and speeds that are higher and cutting forces that are lower than typical feeds, speeds and forces for the machining of solid metal (for example the same metal as that found in powder form in the green part), and even when compared with "soft" metals such as aluminum. In a particular embodiment, a machine tool that is designed for machining wax and plastics (e.g. small desktop CNC milling machine) is used to machine the green part. In a particular embodiment, the cutting feeds and speeds are similar to that used during the machining of wax. In a particular embodiment, the metal powder present in the green part provides for an increased material conductivity when compared to the binder material alone, which may help dissipate heat that may be generated during machining.

In a particular embodiment, the method may be used for the rapid-prototyping of powder injection molding parts, for example to obtain a part for tests. This may allow the final part to be manufactured within a timeline in the order of days rather than months, allowing for quicker manufacture of parts available for testing. For example, shrinkage and deformations of the part until the end of the sintering process can be observed and measured, and a new green part with different dimensions can be produced by machining if the desired final dimensions are not obtained. Iterations in the green part design can thus be done by machining rather than by mold modifications, which in a particular embodiment significantly reduces the development time and development cost for the part. Once the final design has been confirmed, a mold can be ordered for mass production.

The green part may be molded with an integral solid support member which is used to support the part during the machining process. An example of a mold and support member in accordance with a particular embodiment is generally and schematically shown in FIGS. 1-2. In this embodiment, the mold 20 includes a plurality of mold elements which together define a mold cavity 22 having a substantially prismatic shape to define a substantially prismatic green body 50. The mold elements include a bottom plate 24, the support member 26 resting against the bottom plate, an intermediary element 28 resting against and on top of the support member 26, and a top plate 30 resting against and on top of the intermediary element 28. The top surface 32 of the bottom plate 24 and the bottom surface 34 of the top plate 30 both border the mold cavity 22. The intermediary element 28 and an outer portion 36 of the support member 26 both have similar hollow rectangular shapes defining a closed perimeter having an inner surface 38, 40 bordering the mold cavity 22. Although not shown, additional intermediary elements can be used to vary the shape of the green blank; for example, an intermediary element may be received within the support member 26 to close part of the area defined within the support member 26, such as to define a smaller green body 50a as shown for example in FIG. 3b. Additional element(s) may also be added above and/or below the support member 26. Alternately, the intermediary element 28 may be omitted, for example to obtain a thinner green body. Other configurations are also possible.

The mold elements 24, 26, 28, 30 are interconnected to enclose the mold cavity 22. In the embodiment shown and with reference to FIG. 2, this connection is defined by two corner pins 42 extending upwardly from opposed corners of the bottom plate 24 and received in corresponding aligned holes 44 defined through the other mold elements 26, 28, 30. It is understood that the number and configuration of the mold elements may vary, as long as they create the desired shape for the mold cavity and can be disassembled for removal of the molded part without damaging it.

Referring back to FIG. 1, it can be seen that the support member 26 also includes an inner portion 46 protruding from the outer portion 36 into the mold cavity 22, in the form of a plurality of tabs extending inwardly from the inner surface 38. The inner portion 46 is shaped such as to be gripped and retained within the green body 50 after the minimal shrinkage (e.g. 0.5 to 2%) that typically occurs as the binder solidifies after molding. In the particular embodiment shown, the tabs of the inner portion 46 extend perpendicularly from the inner surface 38 to define complementary grooves 48 in the green body 50 (FIG. 2), which compress the tabs as the green body 50 shrinks to lock each tab into its respective groove 48.

Figure 2:
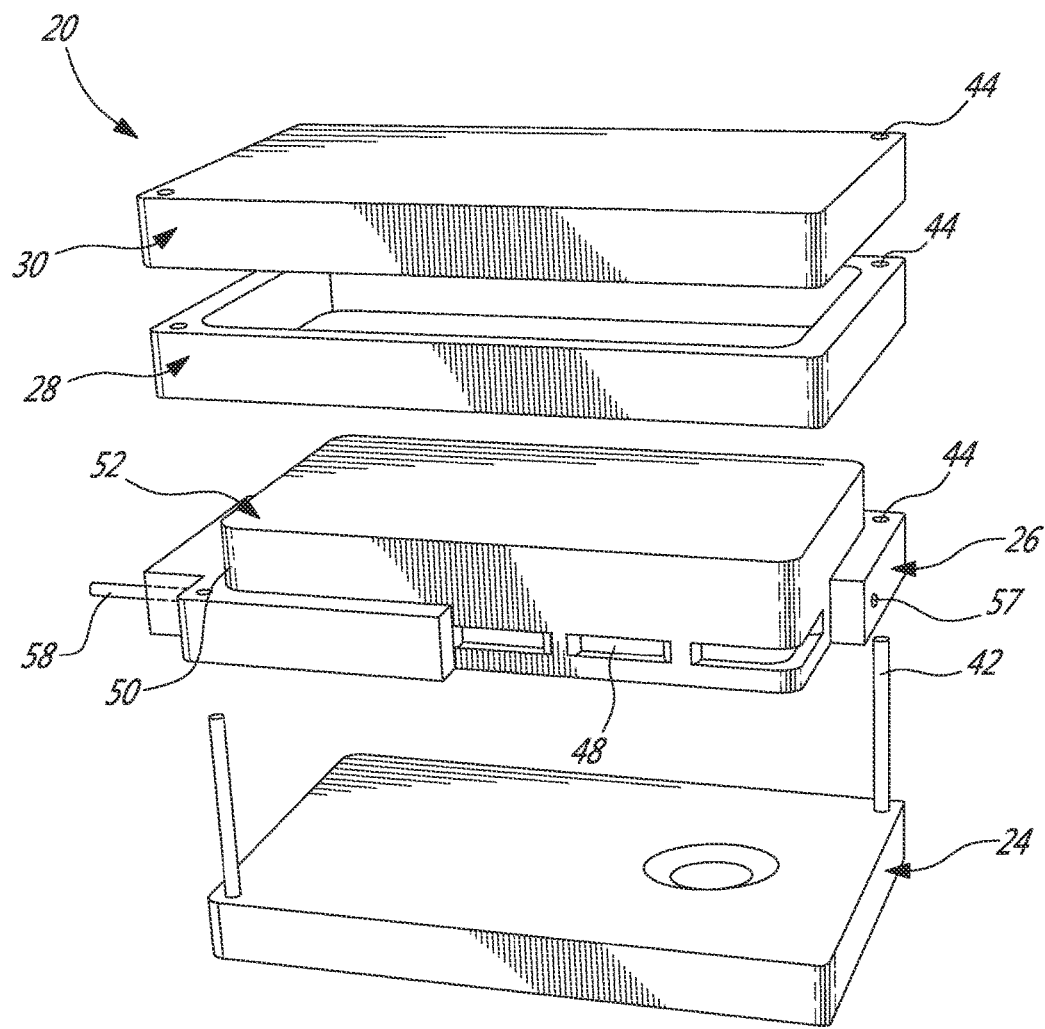
FIG. 2 is a schematic, exploded tridimensional view of the mold of FIG. 1 and of a green body molded therein, with a support member partially broken away to show an underlying portion of the green body, in accordance with a particular embodiment.

After molding, the green body 50 and support member 26 engaged thereto are removed from the mold cavity 22 and disengaged from the other mold elements 24, 28, 30, as shown in FIG. 2. In the embodiment shown, a machining blank 52 includes the green body 50 and the support member 26. The green body 50 is made of the mix of solidified binder and powder material, and accordingly is rigid enough to be able to maintain its shape and for some manipulation. The support member 26 has its inner portion 46 embedded within the green body 50 and its outer portion 36 extending out of the green body 50 and surrounding its perimeter. The support member 26 is made of a solid material having a greater rigidity than that of the solidified green body 50 after molding. In a particular embodiment, the support member 26 is made of the same material as the other mold elements 24, 28, 30; alternately, different materials may be used. An example of a suitable material includes, but is not limited to, solid metal such as hardened steel.

Figure 3A:
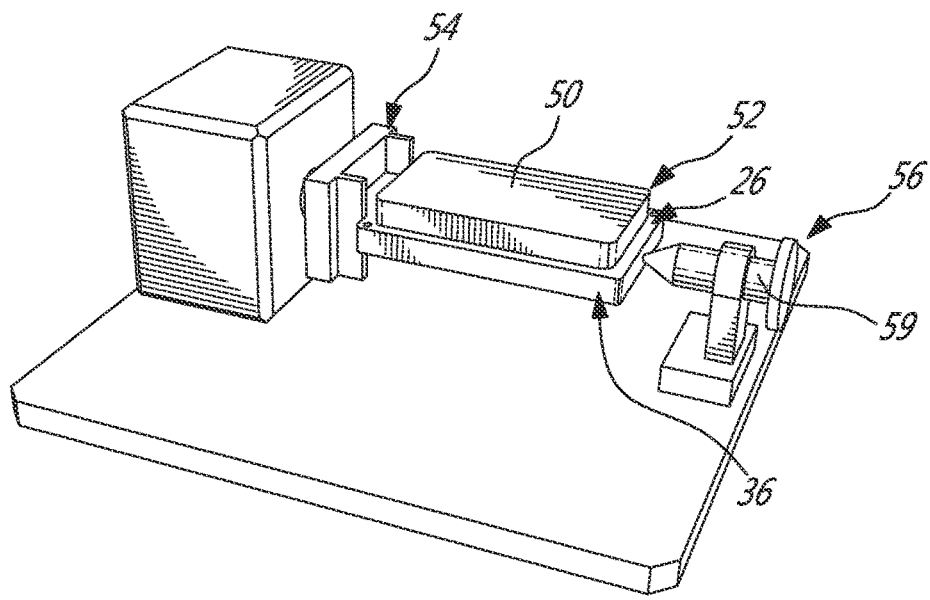
FIG. 3a is a schematic tridimensional view of the green body and support member of FIG. 2 retained in a machine tool.
Figure 3B:
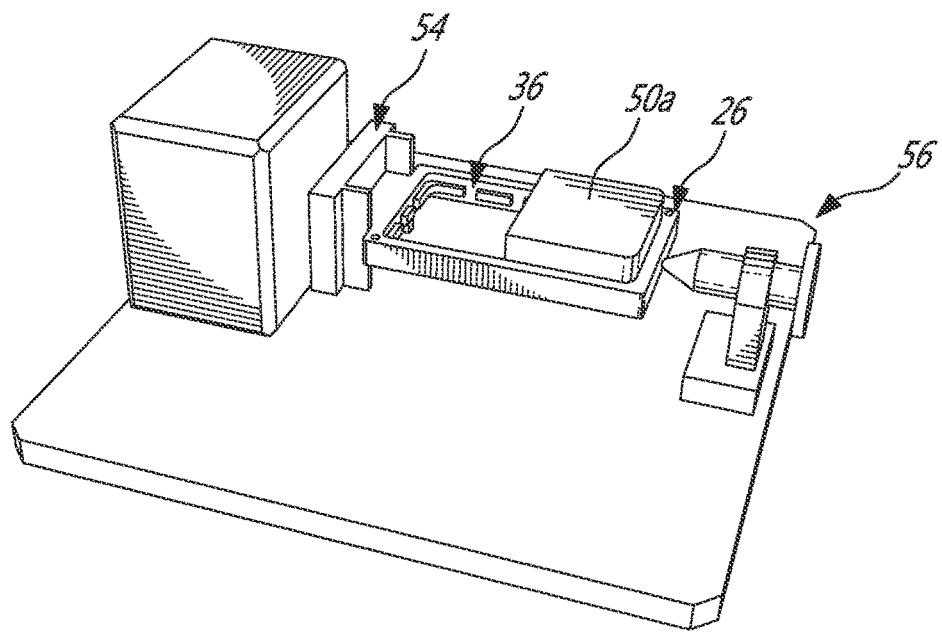
FIG. 3b is a schematic tridimensional view of a green body in accordance with another particular embodiment, in a support member similar to that of FIG. 2, retained in a machine tool.

Referring to FIG. 3a, the support member 26 is engaged with a retaining fixture 54 of the machine tool 56, such as to retain the blank 52 for machining of the green body 50. In a particular embodiment, the outer portion 36 of the support member 26 includes one feature 58 (FIG. 2) of a pair of complementary locating features snuggly engageable with one another, with the other feature of the pair being defined in the retaining fixture 54 of the machining tool 56. In the embodiment shown, the feature 58 of the outer portion 36 is a male locating feature such as a locating pin extending from the outer portion 36 away from the green body 50, and it is snuggly engaged within a corresponding female feature, e.g. locating hole, defined in the machine tool's retaining fixture 54. More than one pair of locating features may be used and/or the configurations of the locating features may vary, but are configured to allow for the support member 26 to be engaged to the retaining fixture 54 with a known location for the machine tool 56. In the embodiment shown, the outer portion 36 further includes a locating hole 57 (FIG. 2) engaging a tailstock 59 (FIG. 3a) of the retaining system of the machine tool 56.

Referring to FIG. 3c, the green body 50 is then machined using the machine tool 56 while the blank 52 is supported through the engagement between the support member 26 and the retaining fixture 54, until the desired shape defining the machined green part 50' is obtained. In a particular embodiment, the retaining fixture 54 maintains the blank 52 in a fixed position during machining by a moving tool, e.g. a CNC milling machine. In another embodiment, the retaining fixture 54 is movable, for example to reposition (e.g.

pivot) the blank 52 between machining steps, and/or to move the blank 52 during machining. In a particular embodiment, machining includes performing a first machining operation, then disengaging the support member 26 from the retaining fixture 54 and re-engaging them in a different relative position and/or orientation before performing another machining operation using the same or a different tool. The complementary locating features on the support member 26 and retaining fixture 54 allow for the location of the green body 50 to be determined during the machining operations.

In the embodiment shown, the green body 50 is machined to produce the machined green part 50' having the desired shape and a retaining portion 50" engaged to the support member 26 and connected to the machined green part 50'. The machined green part 50' remains connected to the support member 26 only through its connection with the retaining portion 50", defined here by a plurality of tabs 51. Accordingly, the support member 26 is disengaged from the machined green part 50' by breaking the connection between the machined green part 50' and the retaining portion 50", either manually or through the machining process.

In a particular embodiment, the support member 26 is freed from the green body, cleaned and re-used in the molding and machining of another green part.

The machined green part 50' is then submitted to a debinding operation to remove most or all of the binder. The green part can be debound using various debinding solutions and/or heat treatments known in the art, to obtain a brown part. After the debinding operations, the brown part is sintered. The sintering operation can be done in an inert gas environment, a reducing atmosphere ($H_2$ for example), or a vacuum environment depending on the composition of material to be obtained. In a particular embodiment, sintering is followed by a heat treatment also defined by the requirements of the material of the finished part. In some cases, it may be followed with hot isostatic pressing (HIP). Coining may also be performed to further refine the profile of the part. It is understood that the parameters of the sintering operation can vary depending on the composition of the feedstock, on the method of debinding and on the configuration of the part.

In another particular embodiment, the support member 26 remains engaged to the machined green part 50' during debinding.

Figure 5:
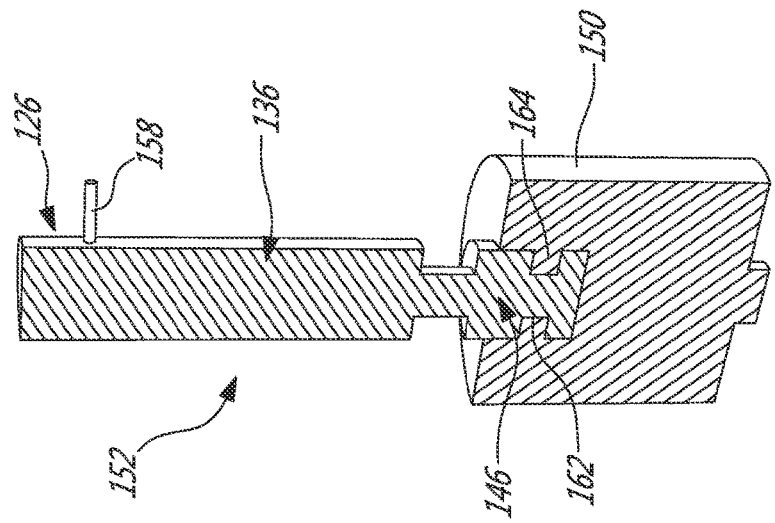
FIG. 5 is a schematic, cross-sectional tridimensional view of the support member engaged to a green body molded in the mold of FIG. 4.
Figure 4:
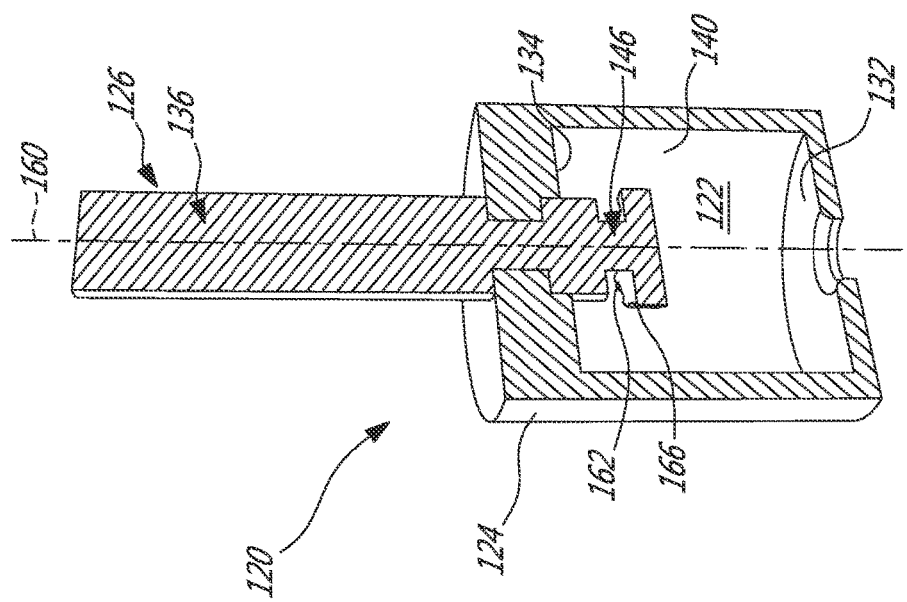
FIG. 4 is a schematic, cross-sectional tridimensional view of a mold including a support member in accordance with another particular embodiment.

An example of a mold and support member in accordance with another particular embodiment is generally and schematically shown in FIG. 4. In this embodiment, the mold 120 includes two mold elements 124 (only one of which is shown, the other being a mirror image thereof) which together define a mold cavity 122 having a substantially cylindrical shape to define a substantially cylindrical green body 150 (FIG. 5). Each mold element 124 defines one-half of the mold cavity 122 with opposed semi-circular wall surfaces 132, 134 interconnected by an arcuate inner wall surface 140 bordering the cavity 122. The mold elements 124 are interconnected to enclose the mold cavity 122. It is understood that the number and configuration of the mold elements may vary, as long as they create the desired shape for the mold cavity and can be disassembled for removal of the molded part without damaging it.

The support member 126 is made of solid material having a greater rigidity than that of the solidified green body 150 and is in the form of a shaft, including an outer portion 136 extending out of the mold cavity 122 and an inner portion 146 extending from the outer portion 136 into the mold cavity 122. In this embodiment, the mold cavity 122 and as such the green body 150 molded therefrom, as well as the support member 126, have a common axis of axisymmetry 160. This configuration may thus be particularly suitable for use with a machine-tool of the turning type (e.g. turning lathe or mill-turn machine).

The inner portion 146 of the support member 126 is shaped such as to be gripped and retained within the green body 150 after the shrinkage occurring during solidification. In the embodiment shown, the inner portion 146 has an annular groove 162 defined in its outer surface, in which the material of the green body 150 engages to form a complementary lip 164 (FIG. 5). The inner portion 146 also includes a series of protruding teeth 166 in which the material of the green body 150 engaged to form complementary teeth (not shown) to form an anti-rotation locking feature. Shrinkage of the green body 150 during solidification tightens the fit between the lip 164 and groove 162 and between the teeth 166 to engage the support member 126 to the green body 150. The green body 150 and support member 126 engaged thereto are removed from the mold cavity 122 and disengaged from the mold elements 124, as shown in FIG. 5, to form the blank 152.

Figure 6A:
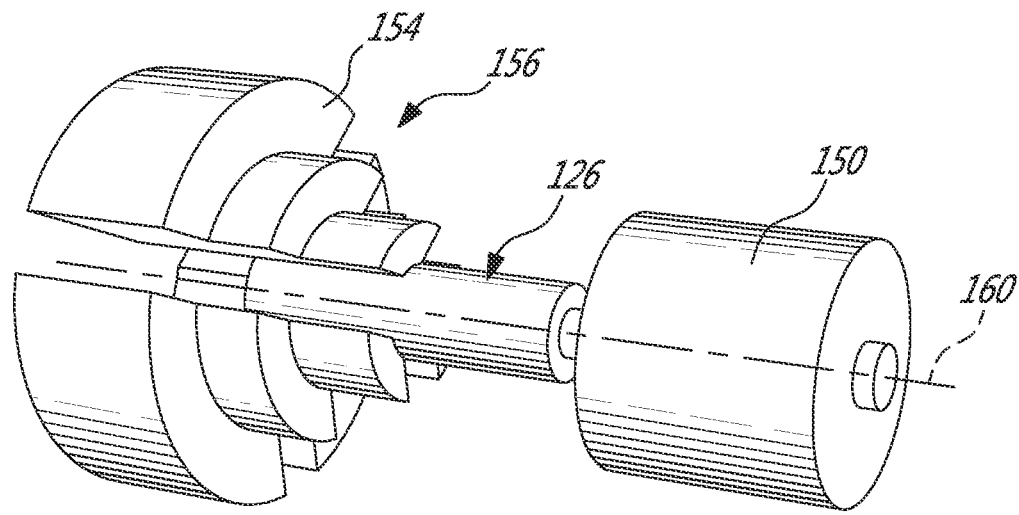
FIG. 6a is a schematic tridimensional view of the green body and support member of FIG. 5 retained in a machine tool.

Referring to FIG. 6a, the support member 126 is then engaged with a retaining fixture 154 of the machine tool 156, such as to retain the blank 152 for machining. Complementary locating features may be provided in the retaining fixture 154 and outer portion 136 of the support member 126, such as for example a locating pin 158 (FIG. 5) extending from the outer portion 136 for snug engagement in a complementary locating hole (not shown) in the retaining fixture 154.

Figure 6B:
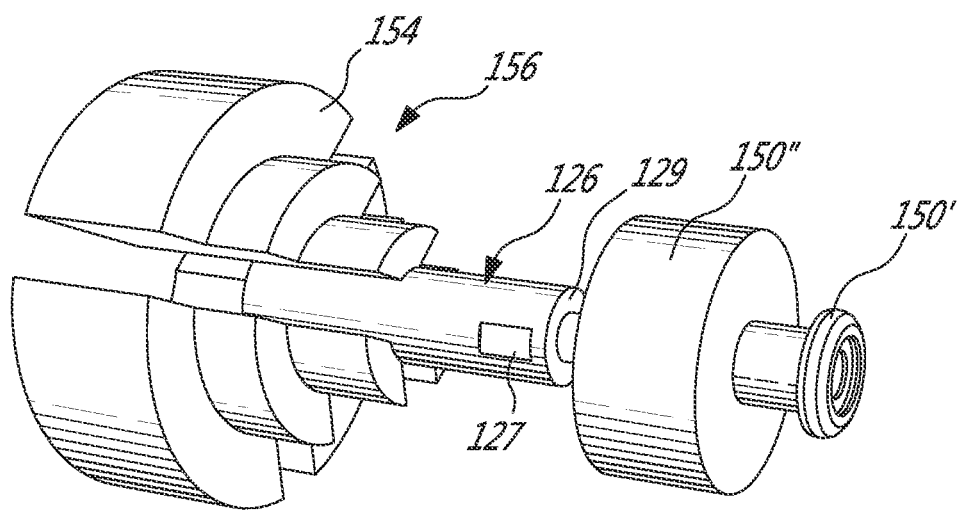
FIG. 6b is a schematic tridimensional view of the green body and support member of FIG. 6a during machining.

Referring to FIG. 6b, the green body 150 is then machined using the machine tool while the blank 152 is supported through the engagement between the support member 126 and the retaining fixture 154, until the desired shape defining the machined green part 150' is obtained. In the embodiment shown, the retaining fixture 154 rotates the blank about its central axis 160 while it is being machined by a moving tool. The machining may include performing two or more machining operations, and disengaging/re-engaging the support member 126 from the retaining fixture 154 between the machining operations. A face 129 of the support member 126 may be used as reference for locating of the blank 152 between set ups and/or additional features may be included in the support member 126 to facilitate location of the blank 152, such as for example a flat reference surface 127.

In the embodiment shown, the machining is performed to obtain the machined green part 150' having the desired shape for the element to be produced, and a retaining portion 150" engaged to the support member 126 and connected to the machined green part 150'. The machined green part 150' remains connected to the support member 126 only through its connection with the retaining portion 150". Accordingly, the support member 126 is disengaged from the machined green part 150' by breaking the connection between the machined green part 150' and the retaining portion 150", either manually or through the machining process. The machined green part 150' is then debound and sintered.

In particular embodiment, the support member 126 is then cleaned by removing the green material remaining connected thereto (e.g. by destroying the retaining portion 150"), and re-used in the molding and machining of another green part.

Although in the embodiments shown the molded green body 50, 150 is depicted as a block shape, i.e. having none of the features of the desired final shape for the part which are thus all obtained by machining, it is understood that in other embodiments the green body may be molded having some of the features of the desired final shape such that only part of the green body is machined, or with an intermediate shape between the block shape and the desired final shape, for example a rough shape approximating and larger than the desired final shape. The method may also be used to perform secondary machining operations on molded parts in the green state, including the removal of gates created by the molding process, testing new/modified features on already molded parts (as opposed to directly molding the modified part using a new/modified mold), and machining difficult to mold features with easier to mold features being directly obtained in the molding step.

The method may be used to shape any type of part that may be obtained by a metal or powder injection molding process, including, but not limited to, gas turbine engine elements such as pieces of fuel nozzles, combustor panels, brackets, vanes, vane segments, vane rings, heat shields, combustion air swirlers, shroud segments, bosses, flanges, tube fittings, adaptors, airfoils, blades, levers, etc.

The shape of the support member 26, 126 may vary and is selected based on the machine tool used and on the configuration of the green body to be machined.

In some embodiments, the configuration of the green body and/or the properties of the feedstock and/or the machining operations to be performed allow for the green body to be sufficiently resistant to be directly supported during the machining operation(s), and accordingly the support member is omitted.

It is understood that the machined green part 50', 150' may be assembled to one or more other green part(s) (whether machined or directly molded to shape) prior to debinding, and these parts may be assembled in their green state, connected using any type of suitable non-detachable connections or detachable connections, and debound and sintered to fuse them together to form the final element. In a particular embodiment, the parts are fused during the debinding step. Alternately, the parts are joined after the debinding step and prior to the sintering step.

The above description is meant to be exemplary only, and one skilled in the art will recognize that changes may be made to the embodiments described without departing from the scope of the invention disclosed. Modifications other than those specifically described above which fall within the scope of the present invention will be apparent to those skilled in the art, in light of a review of this disclosure, and such modifications are intended to fall within the appended claims.

The invention claimed is:

1. A method of manufacturing a part, the method comprising:
    providing a green body made of powder injection molding material, the powder injection molding material including a solidified binder and a powder material mixed with the binder, the green body being connected to a solid support member partially contained in the green body, the solid support member retained in the green body;
    engaging the support member with a retaining fixture of a machine tool;
    while supporting the green body through the engagement between the support member and the retaining fixture, machining the green body using the machine tool to obtain a machined green part; and
    debinding and sintering the machined green part.

2. The method as defined in claim 1, wherein providing the green body includes molding the green body by injecting a feedstock of the powder injection molding material into a mold cavity containing an inner portion of the support member to connect the portion of the support member with the green body, and removing the connected green body and support member from the mold cavity.

3. The method as defined in claim 2, wherein the support member includes an outer portion forming a hollow perimeter with the inner portion extending inwardly from the outer portion, and molding the green body is performed such that the outer portion of the support member surrounds the green body.

4. The method as defined in claim 2, wherein the support member is a shaft and includes an outer portion extending from the inner portion, and molding the green body is performed such that the outer portion of the support member extends out of the green body along a central axis of the green body.

5. The method as defined in claim 1, further comprising, prior to debinding and sintering, disengaging the support member from the machined green part.

6. The method as defined in claim 1, wherein:
    machining the green body is performed to obtain the machined green part and a retaining portion engaged to the support member and connected to the machined green part;
    after machining the green body, the machined green part remains connected to the support member only through the retaining portion; and
    the method further comprises disengaging the support member from the machined green part by separating the machined green part from the retaining portion.

7. The method as defined in claim 1, wherein engaging the support member with the retaining fixture maintains the green body in a fixed position during the machining.

8. The method as defined in claim 1, wherein machining the green body includes rotating the green body with the retaining fixture about a central axis of the support member.

9. The method as defined in claim 1, wherein engaging the support member with the retaining fixture includes snuggly engaging first and second complementary locating features with one another, the first locating feature being provided on the support member and the second locating feature being provided on the retaining fixture.

* * * * *